March 29, 1960
J. F. DUNN
2,930,281
PHOTOMETERS, MORE PARTICULARLY PHOTOGRAPHIC EXPOSURE METERS
Filed Feb. 25, 1955
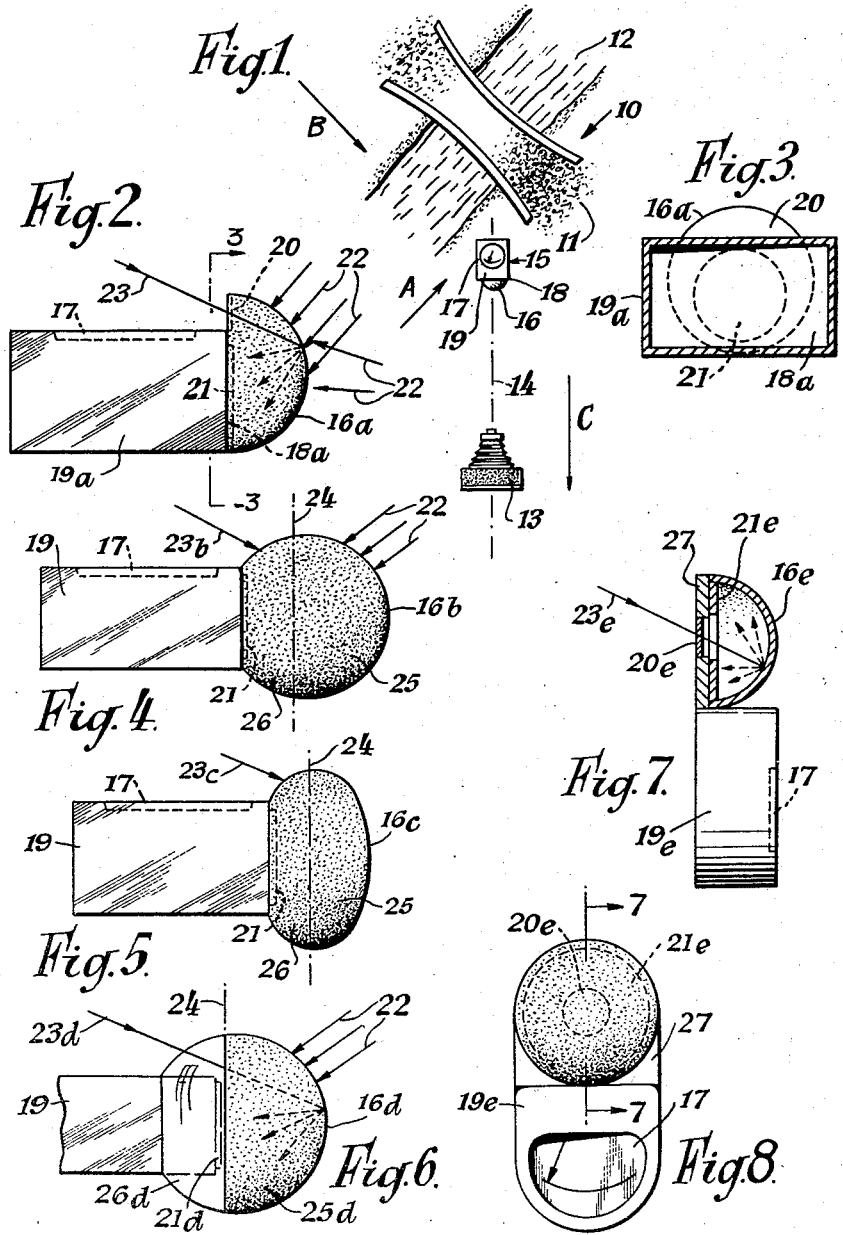
INVENTOR
John Frederick Dunn
BY Brown, Jackson,
Boettcher & Dienner
ATTORNEYS United States Patent Office 2,930,281
Patented Mar. 29, 1960

2,930,281

PHOTOMETERS, MORE PARTICULARLY PHOTOGRAPHIC EXPOSURE METERS

John Frederick Dunn, Bramhall, England, assignor, by mesne assignments, to Daystrom, Incorporated, Murray Hill, N.J., a corporation of New Jersey Application February 25, 1955, Serial No. 490,643

1 Claim. (Cl. 88—23)

This invention relates to photometers and more particularly to those which are used for the determination of photographic exposures and are of the type normally known as incident light meters. Such exposure meters comprise an opalescent screen and means for measuring the amount of light falling upon said screen and transmitted thereby, the screen being placed so as to receive substantially the same illumination as that falling upon the subject as far as the camera aspect is concerned.

It is already known in an incident light meter to employ an opalescent screen which is hemispherical or of other protruding shape, which in use can be directed from the subject towards the camera, in the manner of a bull's eye. Owing to the convex or otherwise projecting nature of the light-receiving surface, the screen is illuminated substantially by direct rays from the sun or other major source, even when such rays are falling at a large angle to the camera axis, provided however that the angle is not greater (or not much greater) than 90°. Thus it is found that when such meters are used in the above-described manner and when the major light source is appreciably behind the subject (as seen from the camera) as in "contra jour" photography, the exposure readings given by hemispherical or other types of screen tend to cause over exposure, which tendency increases as the back lighting angle is increased. Other methods of using incident light meters either fail to compensate for appreciable departures from flat or frontal lighting, or (in the case of "flat screen" types) involve the making of more than one reading by different methods, from which the optimum exposure then has to be calculated.

It is an object of the invention to provide an improved form of incident light meter (particularly for application to photography employing reversal materials, and for colour and motion picture work with any materials) having a three-dimensional translucent screen which also includes a simple compensating means for increasing the versatility of the instrument so as to obtain from a single (camera direction) reading the most pleasing result under all types and directions of subject lighting, and in particular for increasing the accuracy of the instrument for "contra jour" photography.

In an incident light photometer for photography having a translucent screen through which, when facing the subject-to-camera direction, frontal and side light is transmitted to a light-sensitive element which operates a light-intensity indicating means, according to the invention an auxiliary light path to said light sensitive element is provided to enable additional light from behind the subject (i.e. back light), to impinge upon said element in order progressively to modify the exposure indication as the lighting angle increases towards its limiting value of 180° to the camera axis.

In an incident light photometer of the kind having a translucent screen shaped convex at the front to receive on its outer surface a sample of the light falling on the front and sides of the subject, a light-sensitive element illuminated by light issuing from the back of said screen, and light-indicating means operated by the said element according to this invention auxiliary light-receiving means face rearwards to receive a sample of the light falling on the back of the photometer and to reflect this auxiliary sample to the light-sensitive element, thereby increasing the indication of the indicating means to take more and more account of the "back lighting" of the subject as the back lighting angle is increased.

Thus the inner or rear surface of the translucent screen may be illuminated directly by the back light (in addition to the diffuse transmitted component) and may reflect said light to the sensitive element. Preferably a rear aperture or window is provided behind the translucent screen to admit back light. Thus the margin of the translucent screen may overlap the instrument casing or other carrier member so as to provide a backwardly-facing opening or window, this conveniently being segmental in shape: or alternatively a circular or other shaped opening may be provided in the light-sensitive element itself by the latter being of annular or other suitable form. In an alternative construction the translucent screen is shaped so as to include a light-collecting surface which faces rearwards; thus the screen may be arranged in the form of a wholly or partially translucent bulb comprising a fraction of a sphere greater than half in such a way that back light tarnsmitted through the rearward facing translucent or partially clear portion adds to that transmitted through the translucent frontal portion of the bulb by reflection from the inner surface onto the light-sensitive element.

The invention is illustrated by way of example in the accompanying diagrammatic drawings, in which:

Figure 1 is a plan of a typical scene being photographed, using an incident light photometer of the prior art;

Figure 2 is a side elevation of one form of photometer;

Figure 3 is a sectional elevation taken on the line 3—3 of Figure 2;

Figures 4 and 5 are side elevations of photometers having different forms of translucent screens;

Figure 6 is a fragmentary side elevation showing a further form of screen;

Figure 7 is a part sectional side elevation showing the modification employing an annular light-sensitive element, the section being taken on the line 7—7 of Figure 8; and Figure 8 is a front elevation of Figure 7.

In Figure 1 a typical scene or object being photographed is indicated at 10 and includes for instance a bridge 11 over a stream 12, the camera being shown at 13 and having its lens directed along the axis 14. In order to ascertain the required exposure a compensated type incident light photometer, indicated at 15, is held in the same lighting as the subject so that its translucent screen 16 is pointed axially towards (or parallel to the axis of) the camera 13, and a single reading is obtained on an indicator 17 for enabling the correct exposure to be computed. In the present specification the front of the photometer is that part which faces in the subject-to-camera direction (i.e. that of the arrow C in Figure 1) when the photometer is in use.

The form of translucent screen 16 at present available, however, comprises either a flat screen or a hemispherical or other protruding shaped shell which is mounted upon the front end 18 of the photometer body 19 so as to receive a fair sample of the frontal or partial side lighting falling on the object (for example in the direction of the arrow A), but said translucent screen 16 is shielded practically completely by the photometer body 19 as regards any light travelling forwards onto the back of the object 10, for example in the direction of the arrow B. Thus when directed towards the camera and where there is any appreciable illumination from behind the object, the normal incident light photometer tends to underestimate the effective lighting, giving over-exposures in many cases. Other methods of application—such as (a) pointing the translucent screen directly towards the major light source, (b) taking both a light source reading and a camera direction reading and applying some intermediate value or (c) directing the meter to a point intermediate between the light source direction and the camera direction—all fail in one respect or another to give consistent results with a single reading under the maximum number of possible lighting conditions and directions, or combinations thereof. This disadvantage is overcome in the improved photometer by allowing a sample of the "back" or "contra jour" light to act upon the photometer and augment the light-value indication of the instrument.

In the form of photometer shown in Figures 2 and 3 the rectangular or other suitably shaped body 19a has fitted to its front end 18a a white or light tinted translucent screen 16a made from light-diffusing material which is of substantially hemispherical shape and is so placed that its upper part projects beyond the top of the body 19a, leaving a segmental opening 20 which is conveniently spanned by a transparent and, therefore, also translucent window to exclude dust. The usual light-sensitive cell or element is indicated at 21 and is disposed upon the front wall 18a of the body 19a with its sensitive surface facing forwards into the interior of and its enclosure completed by the screen 16a; the element 21 is normally a voltaic type photoelectric cell connected to a micro-ammeter which serves as the indicator 17, the scale usually being calibrated in light-value or exposure units. When the photometer is in use the light falling upon the front of the translucent screen, as shown at 22, is a fair sample of that illuminating the object from the front (e.g. in the direction of arrow A). Moreover any illumination reaching the object from the rearward direction (e.g. in the direction of arrow B) also falls upon the back of the photometer and a sample as indicated at 23 passes through the window 20, thus reaching the interior of the screen 16a, whence it is reflected on to the light-sensitive cell 21. This auxiliary illumination therefore augments the normal light which is radiated on to the cell 21 from the interior of the screen 16a due to light rays 22 falling on the front thereof.

In the modification shown in Figure 4, the translucent screen 16b is in the shape of the major segment of a sphere, the diametral plane at right angles to the axis being indicated at 24. The part 25 of the screen in front of the diametral plane 24 acts in the normal manner and is receptive mainly of frontal and side lighting as indicated at 22. On the other hand the part 26 behind the diametral plane is illuminated mainly by "back" light as indicated at 23b and thus by diffusion augments the illumination inside the screen 16b. The arrangement shown in Figure 5 is similar, but the screen 16c is an oblate spheroid. Again, in Figure 6, the screen 16d is shaped as the major segment of a sphere, but only the portion 25d in front of the diametral plane 24 is translucent, the rear portion 26d being transparent so as to act as a clear window. The cell 21d is conveniently disposed substantially in the diametral plane 24 and is therefore affected only by light received (by transmission and/or reflection) from the interior of the translucent portion 25d. Frontal and side lighting as at 22 illuminate the cell 21d via the screen 16d, as in the previous modification, and light from the rear, as at 23d, passes freely through the clear portion 26d to the internal surface of the translucent portion 25d and thus by reflection augments the illumination of the cell 21d.

Another modification, shown in Figures 7 and 8, allows a sample of light from the rear to pass through an aperture or hole in the light-sensitive cell. The body 19e carrying the indicating device 17, is formed with an upward flange 27 extending as a continuation of the back wall of said device in one direction and to the front of which a disc shaped light-sensitive or photoelectric cell 21e having an aperture is attached, a transparent window 20e being provided in an aperture in the flange which is alined with said cell aperture to allow a sample of light from the back to pass through the aperture in the cell 21e as indicated at 23e. The translucent screen 16e is substantially hemispherical and is mounted over the front of the cell 21e so that it reflects the rays 23e, which pass through the window 20e which supplements the screen, back on to the cell 21e, thus augmenting the general illumination of the cell produced by transmission through said screen.

It will be understood that the above details are given by way of example only and that various other means can be used for introducing a sample of the back lighting into the interior of the screen so as to produce a proper correction of the meter reading.

I claim:

An exposure meter comprising a body carrying a light intensity indicating device and formed with a flange having an aperture and extending as a continuation of the back wall of said device in one direction, a disc shaped photoelectric cell mounted on said flange and provided with a hole alined with said aperture through which light may pass, said photoelectric cell and indicating device being exposable at the front face of the meter, the front face of said photoelectric cell being enclosed in a translucent dome projecting from the said flange, the hole in said photoelectric cell providing means for introducing correction for back-lighting by the admission of light to the inner surface of said translucent dome, and said light intensity indicating device being operated by the photoelectric cell so as to be responsive to both the light striking the front of the dome and that striking the inner surface thereof.

References Cited in the file of this patent

UNITED STATES PATENTS

| | | |
|---|---|---|
| 1,840,500 | Geffcken et al | Jan. 12, 1932 |
| 2,143,500 | Smethurst et al. | Jan. 10, 1939 |
| 2,206,196 | Kubitzek | July 2, 1940 |
| 2,214,283 | Norwood | Sept. 10, 1940 |
| 2,503,768 | Riszdorfer | Apr. 11, 1950 |
| 2,509,366 | Perlin | May 30, 1950 |

FOREIGN PATENTS

| | | |
|---|---|---|
| 888,802 | Germany | Sept. 3, 1953 |